United States Patent [19]

Todd

[11] Patent Number: 5,143,426
[45] Date of Patent: Sep. 1, 1992

[54] VEHICLE WHEEL CONSTRUCTION
[75] Inventor: Kenneth L. Todd, Roseville, Mich.
[73] Assignee: Masco Industries, Inc., Taylor, Mich.
[21] Appl. No.: 726,620
[22] Filed: Jul. 8, 1991

Related U.S. Application Data

[62] Division of Ser. No. 434,155, Nov. 13, 1989, abandoned.

[51] Int. Cl.⁵ .................................................. B60B 7/00
[52] U.S. Cl. .................................. 301/37 P; 301/37 R
[58] Field of Search ............... 301/37 P, 37 R, 37 TP, 301/37 PB

[56] References Cited

U.S. PATENT DOCUMENTS

| | | | |
|---|---|---|---|
| 3,669,501 | 6/1972 | Derleth | 301/37 P X |
| 3,918,762 | 11/1975 | Hampshire | 301/37 R X |
| 4,251,476 | 2/1981 | Smith | 301/37 R X |
| 4,652,148 | 4/1987 | Grill | 301/37 R X |
| 4,976,497 | 12/1990 | Post et al. | 301/37 R |
| 5,088,798 | 2/1992 | Stalter, Sr. et al. | 301/37 P |
| 5,098,272 | 3/1992 | Joseph et al. | 301/37 P X |

FOREIGN PATENT DOCUMENTS

| | | | |
|---|---|---|---|
| 2457907 | 6/1976 | Fed. Rep. of Germany | 301/63 PW |
| 2232129 | 12/1990 | United Kingdom | 301/37 P |

Primary Examiner—Russell D. Stormer
Attorney, Agent, or Firm—Edgar A. Zarins; Malcolm L. Sutherland

[57] ABSTRACT

A method of manufacturing components such as vehicle wheels which include a polystyrene base molded in the general configuration of the ornamental face and a plastic coating molded to the base and mechanically secured thereto to prevent separation. The plastic overlay is moded to the base through a low-pressure injection molding process in order to maintain the integrity of the molded base. The plastic coating flows around portions of the base to provide secure attachment between the base and overlay. The method may be used to manufacture various automotive components including vehicle wheel covers, dams and spoilers.

7 Claims, 2 Drawing Sheets

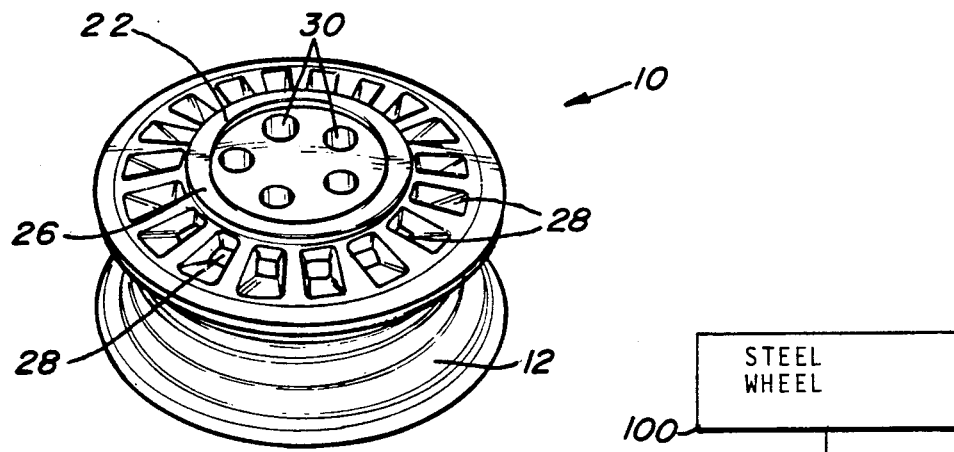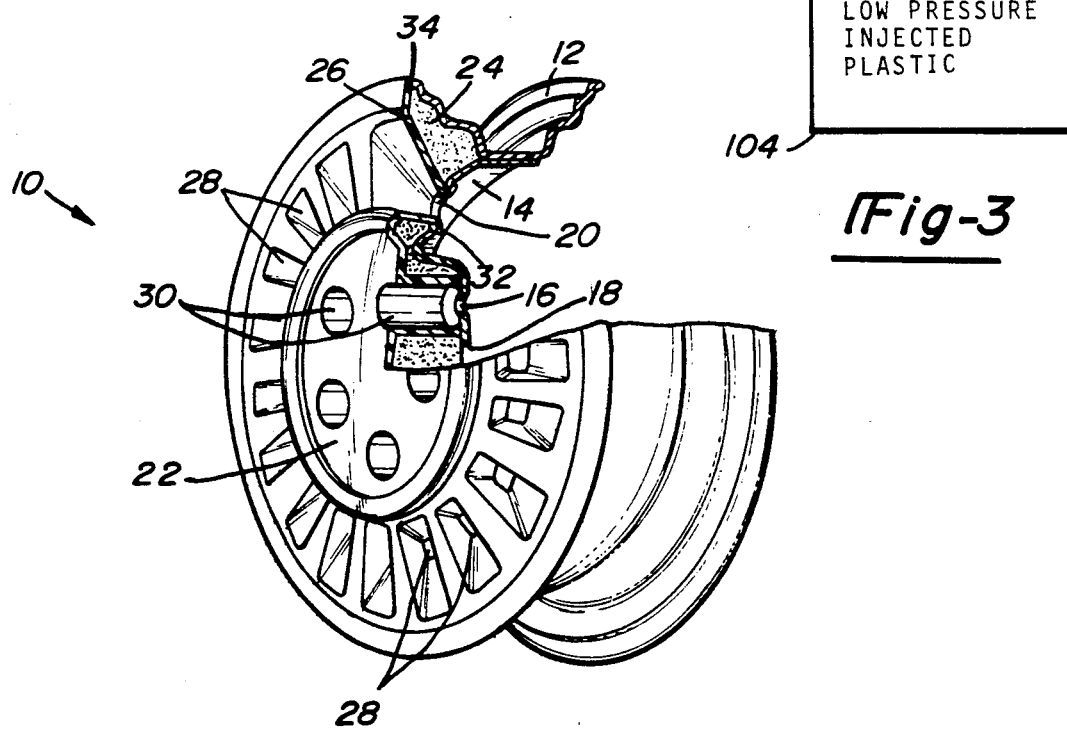

VEHICLE WHEEL CONSTRUCTION

This is a divisional of copending application Ser. No. 07/434,155 filed on Nov. 13, 1989, abandoned.

BACKGROUND OF THE INVENTION

I. Field of the Invention

This invention relates a method of manufacturing plastic components wherein the plastic overlay coat is mechanically locked over a thermoplastic polymer resin base material and, in particular, to a method of applying a plastic fascia through a low-pressure injection molding process to a polystyrene base which has been molded to the desired configuration of the component.

II. Description of the Prior Art

With the increased emphasis on the reduction of vehicle weight for improved performance and fuel savings more vehicle components are being manufactured of lightweight plastics. Additionally, the properties of plastics lends itself in molding ornamental and performance components of motor vehicles. Examples of components which have in the past been molded from plastics include wheel covers, vehicle dams and spoilers, dashboards, etc. However, the pliable nature of thin plastic components requires that a support intrastructure be provided usually by adding metal support structure. Although the ornamental properties of the plastic component are retained, the weight and cost reduction advantages are negated.

In addition to providing the desired ornamental effect, plastic vehicle components must withstand the rigors of the road. Vehicle wheel covers must remain attached to the metal rim even under the stresses produced by the road surface. Additionally, such wheel covers should reduce road noise while withstanding the heat generated by modern disc brakes. Plastic air dams and spoilers must be flexible enough to withstand the forces associated with the moving vehicle yet strong enough to withstand damage. Yet throughout the vehicles life components must maintain their ornamental and aesthetic features.

SUMMARY OF THE PRESENT INVENTION

The present invention overcomes the disadvantages of the prior art by providing components which include a polystyrene base molded in the desired configuration and a thermoplastic fascia coat molded over the base and mechanically locked thereto to prevent separation.

The process of the present invention can be utilized to manufacture various vehicle components including ornamental wheels, air dams, spoilers, dashboards and instrument panels as well as various components for the marine industry. The components generally comprise a polystyrene base which is molded into the general configuration of the component. In the case of the vehicle wheel, the polystyrene base is molded against the metal rim. Applied to the molded base is a plastic coating which assumes the configuration of the base. The coating is applied in such a manner as to "mechanically" lock the thermoplastic fascia to the base. As a result, no adhesive is required although the overlay is secured to the base which provides rigidness to the component.

The general configuration of the component is first formed by molding a thermoplastic polymer resin in accordance with the final specifications of the product. An example of such a resin is a polyphenylene oxide polystyrene developed by G.E. Plastics and marketed under the trademark GECET ®. The GECET ® resin is a high performance expandable foam bead material capable of withstanding high temperatures. During the molding process, the resin will expand to fill the mold. Following molding of the base, a thermoplastic fascia is applied through a low-pressure injection molding process in order to prevent damage to the base material. The thermoplastic fascia is allowed to flow around the base to form a mechanical lock eliminating the need for adhesives. In the case of the vehicle wheel, the thermoplastic material flows around the edges of the vent openings engaging the underlying wheel rim to secure the overlay to the rim.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is a perspective view of a vehicle wheel manufactured using the method of manufacturing of the present invention;

FIG. 2 is a perspective view partially in cross-section of the vehicle wheel manufactured using the process of the present invention;

FIG. 3 is a flow diagram of the manufacturing process of the present invention;

DETAILED DESCRIPTION OF A PREFERRED EMBODIMENT OF THE PRESENT INVENTION

Figure 4A:
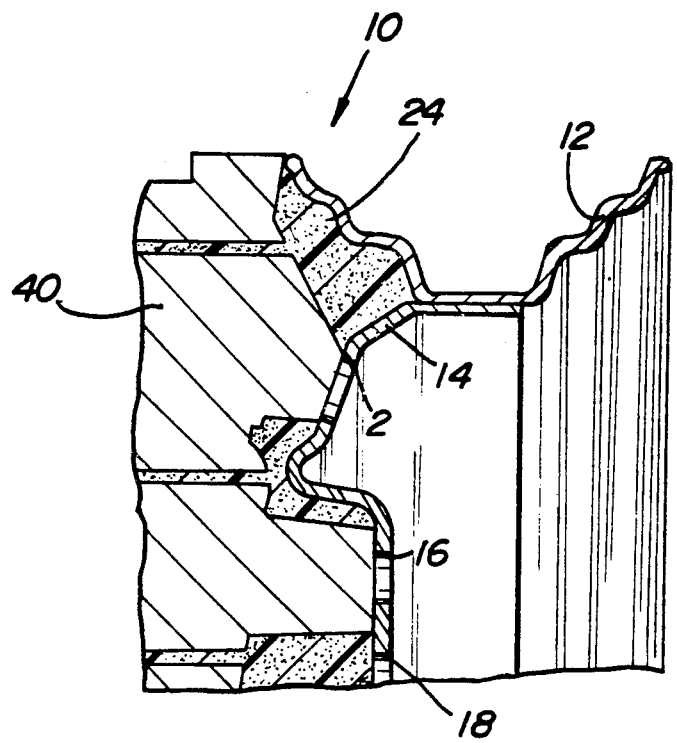
FIG. 4a is a partial cross-sectional view of the base formation of the manufacturing process of the present invention.

Referring first to FIGS. 1 and 2, there is shown a vehicle wheel 10 constructed using the method of manufacture described and defined herein. For purposes of clarity and brevity, the method of the present invention will be described in conjunction with a vehicle wheel 10 although it is to be understood that the method may be used to manufacture various components including air dams, spoilers, dashboards, etc. Description of the vehicle wheel 10 will provide a clear understanding of the composition of related vehicle components.

The wheel 10 preferably includes a drop center steel rim 12 with a central steel disc 14 provided by a manufacturer and adapted to receive a tire. The central disc 14 is provided with a plurality of bolt holes 16 and a wheel spindle-aperture 18 to facilitate removable attachment of the wheel 10 to a wheel hub and its associated brake assembly. In order to ventilate the brake assembly which can produce considerable heat, the central disc 14 also includes a plurality of circumferentially spaced vent openings 20. Thus, the steel wheel comprising the rim 12 and disc 14 is constructed from a functional standpoint to provide the necessary strength and ventilation. In order to provide the wheel 10 with some aesthetic appeal, an ornamental cover 22 formed by the process described herein is attached to the rim 12 and disc 14.

The ornamental cover 22 generally comprises a base material 24 molded into the desired configuration and a decorative fascia 26 molded over the base material 24 as will be subsequently described. In a preferred embodiment, the base 24 is formed from a thermoplastic polymer resin which has a high heat resistance to withstand the heat associated with such wheels 10 and their brakes. An example of such a resin is a polyphenylene oxide polystyrene marketed under the product name GECET ® Resin by G.E. Plastics of Pittsfield, Mass. The resin is provided in solid beads 0.01 to 0.1 inches in diameter and molded using a conventional steam press or vacuum/transfer press as will be described. The resin is a high performance expandable foam bead material with high heat resistance capable of use with temperatures up to 250° F. and a density range of 1.5 to 40 pounds per cubic foot. The thermoplastic fascia 26 is molded over the foam core 24 such that a mechanical lock is formed thereby eliminating the need for adhesives.

The fascia 26 and base 24 are molded such that openings 28 corresponding to the vent openings 20 of the rim 12 and bores 30 corresponding to the bolt holes 16 are formed to provide the required access. The mechanical lock of the fascia 26 around the base 24 and to the rim 12 is formed through the vent openings 20 by molding the thermoplastic around the edges of the openings 20 as will be subsequently described. A flanged lip 32 is formed to secure the fascia 26 to the steel wheel. For added securement, the lip 32 may also be formed around the bolt holes 16. As a result of this mechanical attachment, no adhesive is required. In a preferred embodiment, the peripheral edge 34 of the fascia 26 extends to the edge of the wheel. This same securement principal can be used in other components which have spaced openings such as dashboards or instrument panels. In components which do not include openings, the fascia material may be extended completely around the base material 24 to completely enclose the material.

Figure 4B:
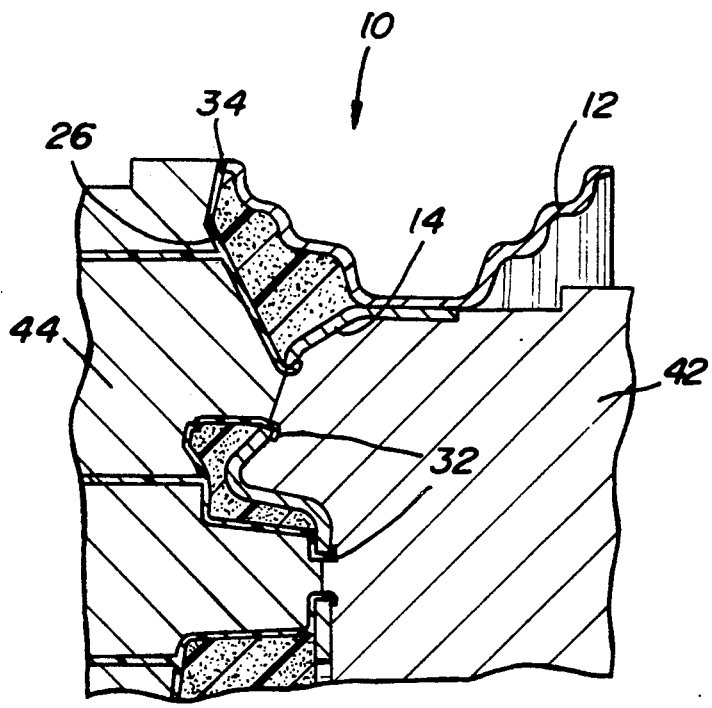
FIG. 4b, is a partial cross-sectional view of the fascia molding of the manufacturing process of the present invention.

Referring now to FIGS. 3 and 4, there is shown and described the method of manufacturing a vehicle component such as the wheel 10 used by way of example herein. In the preferred process, a steel wheel 12 is loaded 100 into a tool as half of the mold to which the ornamental cover 22 will be applied An injection mold 40 is mated with the wheel 12 between which is molded 102 the expandable polystyrene structural base 24. Once the base 24 is set, the steel wheel 12 with the integral foam base 24 is transferred to a second station whereat the thermoplastic fascia 26 is applied through a low-pressure injection molding process 104. Low-pressure injection molding 104 is needed to prevent destruction of the base 24 during molding while allowing the thermoplastic material to fill the mold voids including forming the mechanical lock 32 through the vent openings 20. In order to properly mold the fascia, a backing mold 42 is inserted through the back side of the wheel 12 while an injection mold 44 is mated to the front of the wheel 12. The cooperation of the two mold portions 42 and 44 with the wheel 12 forms the ornamental fascia 26 over the base 24 as well as the mechanical locks 32 to the steel wheel itself.

Thus, the present invention provides an ornamental vehicle wheel which has the ornamental cover attached in such a manner so as to eliminate the retention failure found in conventional wheel covers. The process by which the components are manufactured offers flexibility in styling while maintaining manufacturing costs. The configuration of the plastic cover can be conveniently altered by changing the configuration of the structural core. Although the process was described in conjunction with an ornamental wheel cover, it should be understood that various components could be manufactured in a similar manner including vehicle components such a spoilers and ground effect components and marine components because of the inherent buoyancy of the materials which make up such parts. Furthermore, alternative structural foam products such as closed cell fiberboards can be utilized to form the base as well as alternate molding methods to form the overlay.

The foregoing detailed description has been given for clearness of understanding only and no unnecessary limitations should be understood therefrom as some modifications will be obvious to those skilled in the art without departing from the scope and spirit of the appended claims.

I claim:

1. A composite styled wheel having a metal wheel including a rim adapted to receive a vehicle tire and a central disc for mounting the composite wheel to a vehicle, the central disc including a plurality of vent opening and a plurality of bolt holes for mounting the wheel, said composite wheel comprising:
   a structural base molded against a first side of the metal wheel, said base having a configuration substantially identical to the configuration of the composite wheel ornamentation, said base molded such that said vent openings and bolt holes remain exposed; and
   a fascia covering said structural base and conforming to the surface configuration of said base in order to capture said base against the first side of the metal wheel, said fascia intermingling with an outer surface layer of said base to form an integral bond therewith and extending into and engaging said vent openings of the metal wheel to mechanically lock said fascia to the metal wheel, said integral bond preventing separation of said fascia from said base and said mechanical lock preventing separation of said fascia and base form the metal wheel.

2. The composite wheel as defined in claim 1 wherein said fascia conforms to said outer surface configuration of said base, said fascia being applied to said base such that damage to said outer surface configuration is prevented.

3. The composite wheel as defined in claim 2 wherein said structural base is molded from a polystyrene resin formed of a thermoplastic polymer expandable bead.

4. The composite wheel as defined in claim 3 wherein said fascia is molded from a thermosplastic material, said material flowing into said outer surface layer of said base to form said integral bond.

5. The composite wheel as defined in claim 4 wherein said fascia forms a flanged lip around the edges of said vent openings of the metal wheel to mechanically lock said fascia to the disc.

6. The composite wheel as defined in claim 5 wherein a peripheral edge of said fascia detachably engages the edge of the rim.

7. A composite styled wheel having a metal wheel including a rim adapted to receive a vehicle tire and a central disc for mounting the composite wheel to a vehicle, the central disc including a plurality of vent openings and a plurality of bolt holes for mounting the wheel, said composite wheel comprising:
 a structural base molded against a first side of the metal wheel, said base having a surface configuration substantially identical to the configuration of the composite wheel ornamentation said base molded from a polystyrene resin formed of a thermoplastic polymer expandable bead with a compressible outer surface layer such that said vent openings and bolt holes remain exposed; and
 a fascia covering said structural base and conforming to the surface configuration of said base in order to capture said base against the first side of the metal wheel, said fascia molded to said structural base such that said fascia intermingles with said outer surface layer without compressing said outer surface layer to form an integral bond between said fascia and base, said fascia extending into and engaging the edges of said vent openings of the metal wheel to mechanically lock said fascia to the metal wheel, said integral bond preventing separation of said fascia from said base and said mechanical lock preventing separation of said fascia and base from the metal wheel.

* * * * *